Patented Oct. 27, 1936

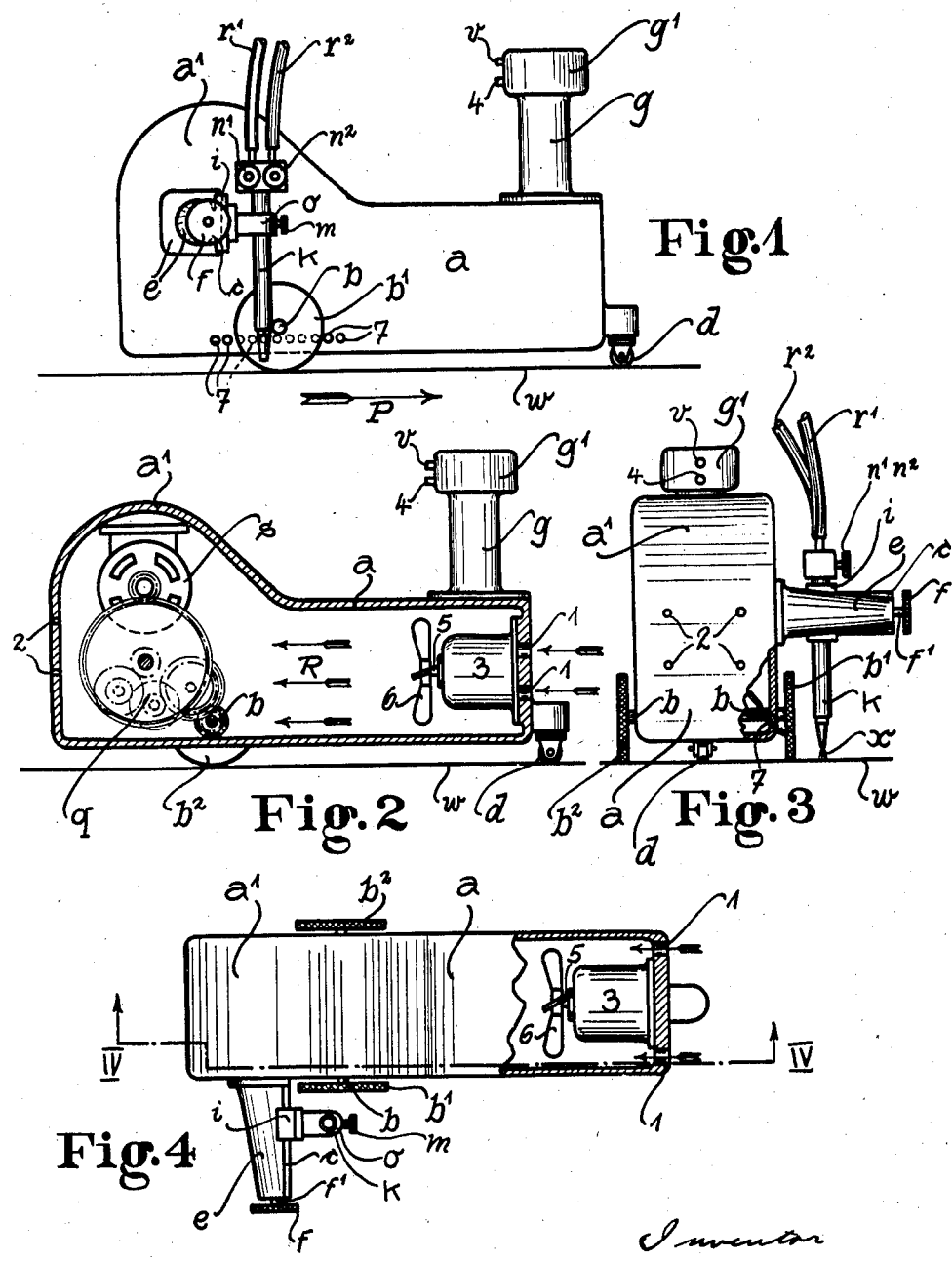

2,058,672

UNITED STATES PATENT OFFICE 2,058,672

PORTABLE BLOWTORCH APPARATUS

Wilhelm Eberle, Frankfort-on-the-Main, Germany, assignor to Messer & Co., G. m. b. H., Frankfort-on-the-Main, Germany, a corporation of Germany Application July 5, 1935, Serial No. 30,040
In Germany August 1, 1934

8 Claims. (Cl. 266—23)

This invention relates to certain improvements in portable blow torch apparatus, and the main object of the invention is to prevent the heat developed by the torch from injuriously affecting the parts which support and carry the torch. The invention relates more particularly to that type of apparatus in which the torch is carried by a casing movable over the work and in which it is desirable to mount the torch as closely as possible to the casing wall. The invention is suited particularly to all small portable types of blow torch apparatus which are placed directly on the work itself and moved over the work in the cutting process.

In the accompanying drawing there is illustrated merely as an example one form of portable blow torch apparatus embodying my invention. In this drawing:

Fig. 1 is a side elevation of the apparatus;

Fig. 2 is a vertical longitudinal section taken on the line IV—IV of Fig. 4;

Fig. 3 is an end view, a portion of the casing wall being broken away; and

Fig. 4 is a top plan view, a portion of the casing being broken away.

In the construction illustrated, my improved apparatus includes a casing $a$ provided with suitable means for supporting it upon the work and permitting it to roll over and be guided thereon. For this purpose the casing intermediate of its ends is provided with an axle $b$ carrying upon opposite ends thereof a pair of rollers or wheels $b^1$, $b^2$. At one end of the casing is a small roller $d$ in the nature of a caster, thus providing a three-wheel support for the casing and permitting it to be readily guided or steered over the work. At the same end of the casing as the roller $d$ is a handle $g$ which may be gripped for steering the casing.

On one of the side walls of the casing and at the end opposite to the handle $g$ there is provided a bracket $e$ having a slide $i$ adjustable in a horizontal direction along the bracket and toward and from the wall of the casing. This slide may be connected to and operated by a spindle $f^1$ having a handle $f$. The slide $i$ is provided with an opening or eye $o$ extending in a substantially vertical direction to receive the blow torch or burner $k$ and this blow torch may be vertically adjusted in respect to the slide and locked in adjusted position in any suitable manner, for instance by a set screw $m$. The blow torch is of the usual construction and is provided with the usual valves $n^1$, $n^2$ for controlling the fuel gas and combustion supporting gas delivered through the pipes $r^1$, $r^2$.

For propelling the casing over the work there is provided an electric motor $s$ mounted at least in part in a dome on the casing at the end opposite to the handle $g$. This motor is geared to the axle $b$ by any suitable form of speed reducing gearing $q$ somewhat conventionally illustrated. The motor may be controlled by means of a switch $v$ disposed in the head $g^1$ of the handle $g$.

In the construction illustrated it will be noted that the blow torch or burner $k$ is or may be disposed closely adjacent to the side wall of the casing and also closely adjacent to the wheel $b^1$ and that in order to properly support and balance the weight it is necessary that this wheel be mounted reasonably close to the electric motor $s$ and the driving gear.

The main feature of my invention relates to the means whereby the transmission of the heat from the torch directly to the casing and casing propelling parts is very greatly reduced, if not prevented.

In carrying out my invention the end wall of the casing adjacent to the roller $d$ is provided with a plurality of openings $1$, and the opposite end wall of the casing is provided with openings $2$. The casing adjacent to the openings $1$ is provided with an electric motor $3$ which may be controlled by a switch $4$ on the head $g^1$ adjacent to the switch $v$ so that the two electric motors $s$ and $3$ may be independently controlled. On the shaft $5$ of the electric motor there is a ventilating fan or blower blades $6$. The longitudinal wall of the casing adjacent to the burner $k$ is provided with a plurality of openings $7$ extending downwardly and outwardly. Some of these openings $7$ are directed against the inner surface of the wheel $b^1$ while others are directed in advance of and others in the rear of said wheel.

In the operation of the apparatus the casing is placed on the workpiece with the torch directed at the line to be heated or along which the cut is to be made, and by closing the switch $v$ the motor $s$ is started and the apparatus is caused to pass over the surface of the workpiece in the direction of the arrow P. Upon closing the switch $4$ the electric motor $3$ starts the blower $6$ and the latter sucks in air through the openings $1$ in the direction of the arrows R through the interior of the casing $a$, cooling the members therein, and particularly the electric motor $s$ and the reduction gearing $q$ which are nearest to the cutting flame of the burner.

A part of the air escapes through the openings 2 while another part escapes through the inclined openings 7 in the direction of the cutting flame x as indicated in Fig. 3.

The objectionable heating of the apparatus is prevented in part due to the fact that the main air current is blown through the casing of the blow torch apparatus and in part because the air current escapes through the lateral openings, thus carrying away the heat from the side of the flame nearest to the apparatus and preventing any appreciable heat radiation against the apparatus.

It is important that there be provided separate motors for the propelling gearing and for the fan because it is often necessary to propel the apparatus at a comparatively slow rate while cutting a thick workpiece, and it is at such times that the motor of the fan should be going at full speed to prevent transmission of heat from the hot metal and the torch to the slow moving casing. The addition of the second motor does not add materially to the weight, cost or size of the apparatus as the required amount of air circulation may be obtained by the use of a comparatively small and inexpensive type of fan and motor.

Having thus described my invention, what I claim as new and desire to secure by Letters Patent is:

1. A portable blow torch apparatus including a casing, a torch carried thereby and disposed in close proximity thereto, wheels for supporting said casing, a motor in the interior of said casing, a driving connection between said motor and said wheels, and a blower electrically operated independently of said motor and disposed in the interior of said casing for inducing cooling air currents through said casing.

2. A portable blow torch apparatus including a casing, a torch mounted thereon, the wall of said casing adjacent to said torch having an aperture therethrough extending in a direction toward the tip of said torch, and means for blowing cooling air through said aperture, whereby the radiation of heat from the flame of said torch to the casing is minimized during operation of said torch.

3. A portable blow torch apparatus including a casing, a torch supported on one side of said casing, power means within said casing near one end thereof for driving said casing, and a blower within and near the opposite end of said casing, the end wall of said casing adjacent to said blower having an air inlet aperture, the other end wall of said casing having an air outlet aperture, whereby circulation of air through the casing is induced by the action of said blower to cool the interior of said casing, the side wall of said casing adjacent to said torch also having an outlet aperture directed toward the tip of said torch, whereby the air forced from said latter aperture will minimize the radiation of heat from the flame of said torch to the casing during operation of said torch.

4. A portable blow torch apparatus including a casing, a torch carried thereby, an electric motor within said casing for propelling the latter, a blower electrically operated independently of said motor and disposed within said casing for inducing air currents therethrough for cooling the interior thereof, a handle on said casing for steering said casing, and switches on said handle for selectively operating said motor and said blower.

5. A portable blow torch apparatus including a frame structure, a torch mounted thereon, wheels for supporting the same, a motor supported on said frame structure, a reduction gearing between said motor and said wheels, and means for blowing air around said motor and said gearing and for directing a stream of cooling air towards the tip of said torch to prevent transfer of heat from said torch to adjoining members on said structure.

6. A portable blow torch apparatus including a frame structure, a torch carried thereby, and two independently operated electric motors supported on said frame structure, one for propelling said frame structure and the other for cooling the first motor.

7. A portable blow torch apparatus including a frame structure, a torch mounted thereon, a motor also mounted thereon, wheels for supporting the frame structure, transmission gearing between said motor and said wheels for propelling said frame structure, a second electric motor on said frame structure operated independently of said first motor, and a fan on said second motor for cooling said first motor and said transmission gearing.

8. A portable blow torch apparatus including a frame structure, a torch mounted thereon, means for propelling said frame structure, a blower also supported on said frame structure for preventing overheating of certain parts of said apparatus, and means for operating said blower at a constant speed irrespective of the speed of operation of said propelling means.

WILHELM EBERLE.